United States Patent [19]

Gerber et al.

[11] Patent Number: 5,218,083
[45] Date of Patent: Jun. 8, 1993

[54] POLYIMIDES PREPARED FROM 3,5-DIAMINOBENZOTRIFLUORIDE

[75] Inventors: Margaret K. Gerber, Newport News; Terry L. St. Clair, Poquoson; J. Richard Pratt, Poquoson; Anne K. St. Clair, Poquoson, all of Va.

[73] Assignee: The United States of America as represented by the United States National Aeronautics and Space Administration, Washington, D.C.

[21] Appl. No.: 429,574

[22] Filed: Oct. 31, 1989

[51] Int. Cl.5 .............. C08G 69/26; C08G 73/10; C08G 77/04
[52] U.S. Cl. .................. 528/353; 528/26; 528/28; 528/125; 528/128; 528/170; 528/172; 528/173; 528/179; 528/183; 528/188; 528/220; 528/229; 528/350; 528/351
[58] Field of Search ........... 528/353, 26, 28, 229, 528/170, 172, 125, 173, 128, 179, 183, 220, 351, 350, 188, 351

[56] References Cited

U.S. PATENT DOCUMENTS

| | | | |
|---|---|---|---|
| 4,588,804 | 5/1986 | Fryd | 528/125 |
| 4,876,329 | 10/1989 | Chiang et al. | 528/353 |
| 4,876,330 | 10/1989 | Higashi et al. | 528/353 |
| 4,996,278 | 2/1991 | Lee | 528/26 |
| 4,997,908 | 3/1991 | Lee | 528/26 |
| 5,021,540 | 6/1991 | Leone-Bay et al. | 528/183 |
| 5,061,781 | 10/1991 | Leone-Bay et al. | 528/351 |
| 5,093,453 | 3/1992 | St. Clair | 528/188 |

OTHER PUBLICATIONS

Synthesis and Characterization of Essentially Colorless Polyimide Films, Ann K. St. Clair, Terry L. St. Clair and Keziban R. Shevet.
"Approaches to Organic Dielectrics with Reduced Moisture Absorption & Improved Electrical Properties", David L. Goff et al., E. I. Du Pont De Nemours & Co., Electrical Dept. pp. 186–189.
CA 101:152884h "Regular Aromatic Fluorine Containing Polyamides for Heat Resistant Films", B. F. Malichenko, et al.
"Synthesis of Characterization of a Series of Polyimides Derived from 4,4'[2,2,2-Trifluoro-1-(trifluoromethyl)ethylidene]-bis [1,3,-isobenzofurandione"], G. R. Husk et al., Macromolecules, 1988 vol. 21, 1234–1238.
"5-Trifluoromethyl-1,7-phenanthroline", J. Heterocyclic Chem., 13, 375 (1976), pp. 375–376.

*Primary Examiner*—John Kight, III
*Assistant Examiner*—P. Hampton-Hightower
*Attorney, Agent, or Firm*—George F. Helfrich

[57] ABSTRACT

High performance, thermooxidatively stable polyimides are prepared by reacting aromatic diamines with pendant trifluoromethyl groups and dianhydrides in an amide solvent to form a poly(amic acid), followed by cyclizing the poly(amic acid) to form the corresponding polyimide, which has the following general structure:

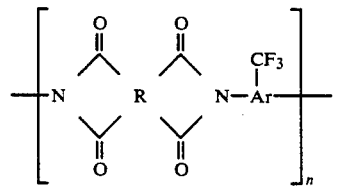

Where R is any aromatic or substituted aromatic group,
Ar is any aromatic or substituted aromatic group and
n ≈ 10–100.

4 Claims, No Drawings

POLYIMIDES PREPARED FROM 3,5-DIAMINOBENZOTRIFLUORIDE

ORIGIN OF THE INVENTION

The invention described herein was made in the performance of work under a NASA contract and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

The present invention relates generally to polymeric materials which are suitable for high temperature applications as a result of this high thermooxidative stability. It relates particularly to a series of polyimides based on aromatic diamines with a pendant trifluoromethyl grouping.

2. Description of Related Art

Polyimides are an important class of polymers for high temperature applications due to their high thermooxidative stability. One monomer of major importance in preparing these high temperature polyimides is 1,3-phenylenediamine (m-PDA). 3,5-Diaminobenzotrifluoride (DABTF), a reported diamine (R. A. Henry, D. W. Moore and R. L. Atkins, *J. Heterocyclic Chem.*, 13, 375 (1976).), is an analog of m-PDA and contains a symmetrically, substituted polar $CF_3$ group. Diamines and dianhydrides containing two or more of these trifluoride groups such as 2,2-bis(3,4-dicarboxyphenyl)hexafluoropropane dianhydride (6FDA), 2,2-bis(3-aminophenyl)hexa-fluoropropane, (6F) 2,2-bis[4-(4-aminophenoxy)phenyl]hexafluoropropane (4-BDAF), and 2,2-bis[4-(3,4-dicarboxyphenoxy)phenyl]hexafluoropropane dianhydride (BFDA) are known in the polyimide literature. (D. L. Goff and E. L. Yuan, Polymeric Materials Science and Eng., Preprints 59, 186 (1988). G. R. Husk, P. E. Cassidy and K. L. Gebert, *Macromolecules* 21, 1234–1238 (1988). T. L. St. Clair, A. K. St. Clair and E. N. Smith, Structure-Solubility Relationships in Polymers, Academic Press, Inc. New York, N.Y. 199–214 (1977).)

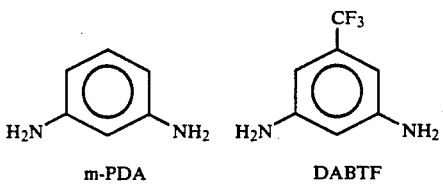

An object of the present invention is to provide a polyimide based on DABTF that provides high molecular weight poly(amic acid) solutions that yield creasable free-standing films and coatings in the fully cured form.

Another object of the present invention is to provide fully cured polyimide films based on DABTF with enhanced solubility in common organic solvents such as methylene chloride, N,N-dimethylacetamide (DMAc) and m-cresol.

Another object is to provide a polyimide composition based on DABTF which exhibits a lowered dielectric constant, compared to state-of-the-art polyimides, in the range of 2.5 to 3.0 at 10 GHz.

Another object is to provide a high temperature aromatic polyimide prepared from DABTF which exhibits improved optical transparency, compared to state-of-the-art polyimides.

A further object is to provide polyimides based on DABTF that form well-consolidated moldings.

Another object is to provide a polyimide based on 4-trifluoromethyl-2,6-diaminopyridine and 6FDA that has a high level of fluorine atoms per repeat unit.

Another object is to provide a polyimide with pendant trifluoromethyl groups that contains a nonbenzenoid aromatic moiety.

SUMMARY OF THE INVENTION

By the present invention, a series of thermooxidatively stable polyimides are produced which have greater solubility in polar solvents, less color and lower dielectric constants than state-of-the-art polyimides. These polyimides form free-standing films, coatings and moldings. It is anticipated that these polyimides will provide useful materials for aerospace and electronic applications.

The polyimides of the present invention are advantageously prepared by reacting 3,5-diaminobenzotrifluoride (DABTF) with one or more of the following dianhydrides:

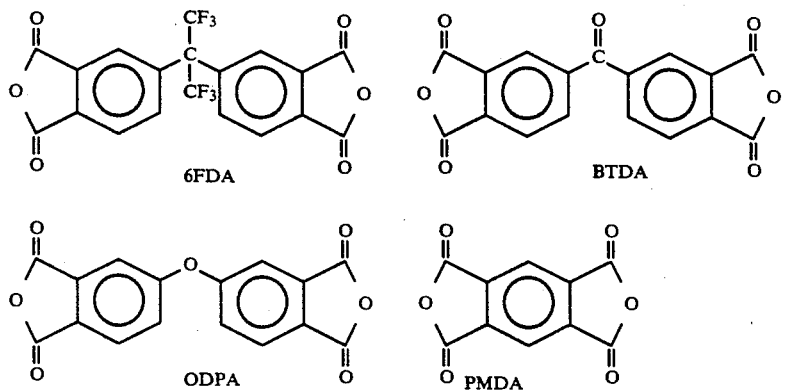

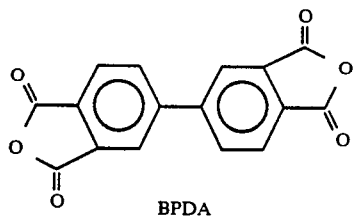
BPDA

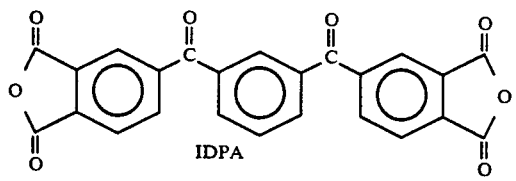
IDPA

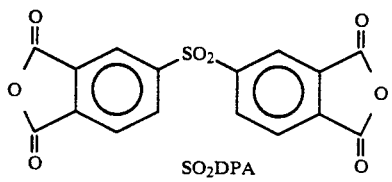
SO₂DPA

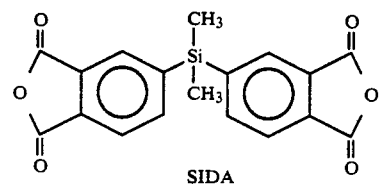
SIDA

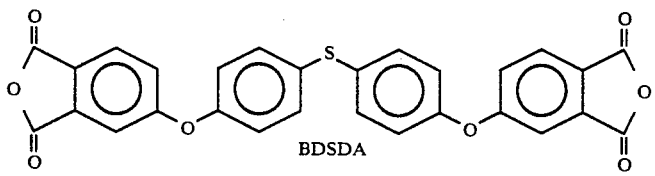
BDSDA in N,N-dimethylacetamide (DMAc) and then thermally cyclizing the resulting poly(amic acid) to the corresponding polyimide.

DESCRIPTION OF THE PREFERRED EMBODIMENTS

According to the present invention, polymerizations were conducted at room temperature in amide solvents such as DMAc at 20 percent solids using purified monomers consistent with the following reaction scheme:

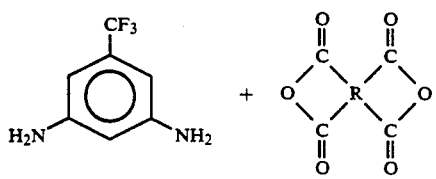

Room temperature in amide solvent, 20% w/w solids

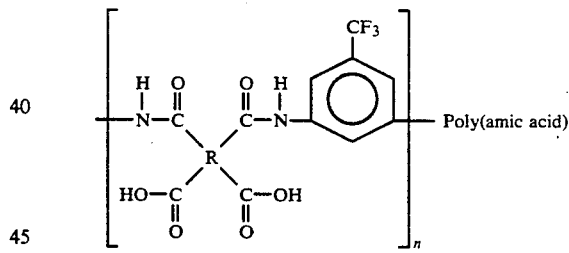
Poly(amic acid)

Thermal cure (300° C.)

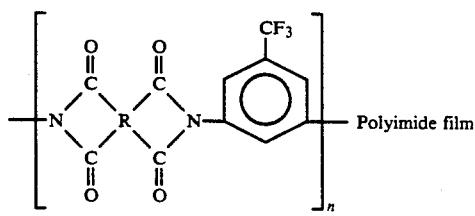
Polyimide film

Where n = 10–100
Where R is:

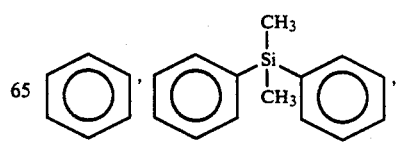

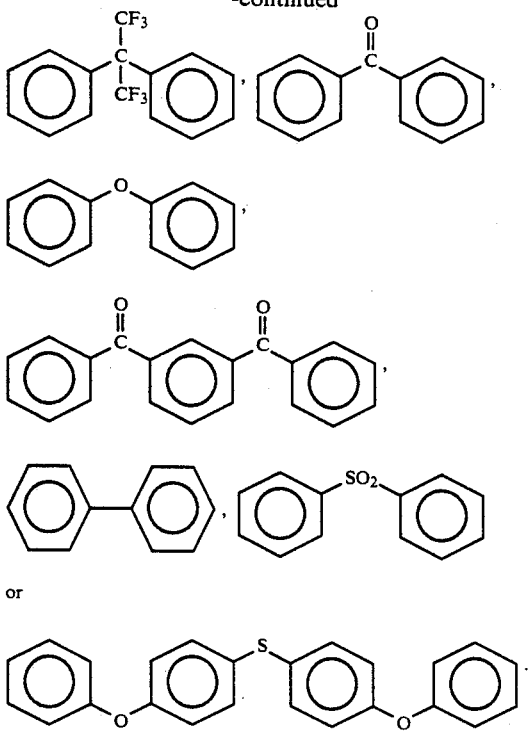

A diamine solution was prepared in an amide solvent such as DMAc. The dianhydride was then added as a solid in one single portion at room temperature to form a poly(amic acid). This solution was then poured onto a glass plate and spread with a doctor blade set at a specified blade gap to form a film or coating. The poly(amic acid) film was then thermally converted to the polyimide by heating to 300° C.

Although the dianhydrides shown above were used in the examples set forth below, other dianhydrides could be used to prepare thermooxidatively stable polymers with the DABTF diamine.

Although DMAc was used as the solvent medium to prepare the poly(amic acids) in the examples set forth below, other solvents could be used such as N,N-dimethylformamide (DMF), tetrahydrofuran (THF) and 1-methyl-2-pyrrolidinone (NMP). These would also produce high quality polyimides.

SPECIFIC EXAMPLES

Example I

A solution of N,N-dimethylacetamide (DMAc) (10.96 g) and 3,5-diaminobenzotrifluoride (DABTF) (0.9688 g, 0.0055 mol) was prepared. 3,3',4,4'-Benzophenonetetracarboxylic dianhydride (BTDA) (1.7723 g, 0.0055 mol) was added as a solid in a single portion, and the solution was stirred at room temperature overnight. The inherent viscosity of the resulting poly(amic acid) solution was 0.53 dl/g at 35° C. in DMAc. A film of 15 mil nominal wet thickness was cast on a soda lime glass plate and allowed to dry for 24 hour in a low humidity chamber purged with dry air. The film was cured for one hour each at 100°, 200°, and 300° C. in a flowing air oven. The resulting imidized pale yellow colored film was creasable and insoluble in approximately one percent refluxing methylene chloride. However, the film was soluble in refluxing DMAc and m-cresol at this concentration. Dynamic thermogravimetric analysis (TGA) indicated a five percent weight loss at 520° C. and ten percent weight loss at 551° C. The film had a Tg of 294° C. by differential scanning calorimetry (DSC). The dielectric constant of this polyimide film was 2.90 at 10 GHz.

Example II

A solution of DMAc (2.8176 g) and DABTF (0.2000 g, 0.001135 mol) was prepared. 2,2-Bis(3,4-dicarboxyphenyl)hexafluoropropane dianhydride (6FDA) (0.5044 g, 0.001135 mol) was added as a solid in a single portion and the solution was stirred at room temperature overnight. The inherent viscosity of the resulting poly(amic acid) solution was 0.70 dl/g at 35° C. in DMAc. A film of 20 mil nominal wet thickness was cast on a soda lime glass plate and allowed to dry 24 hours in a low humidity chamber purged with dry air. The film was cured in a flowing air oven for one hour each at 100°, 200° and 350° C. The resulting thermally imidized, pale gold colored film was creasable and insoluble in one percent refluxing methylene chloride. However, the film was soluble in refluxing DMAc and m-cresol. Dynamic TGA indicated a five percent weight loss at 492° C. and ten percent weight loss at 511° C. The film had a Tg of 297° C. by DSC. The dielectric constant of this polyimide film was 2.58 at 10 GHz.

Example III

Example III A solution of DMAc (4.4178 g) and DABTF (0.4000 g, 0.002271 mol) was prepared. 4,4'-Oxydiphthalic anhydride (ODPA) (0.7044 g, 0.002271 mol) was added as a solid in a single portion, and the solution was stirred at room temperature overnight. The inherent viscosity of the resulting poly(amic acid) solution was 0.34 dl/g at 35° C. in DMAc. A film of 20 mil nominal wet thickness was cast on a soda lime glass plate and allowed to dry in air overnight in a low humidity chamber purged with dry air. The film was cured in a flowing air oven for one hour each at 100°, 200° and 300° C. The resulting thermally imidized yellow colored film was creasable and insoluble in 1 percent refluxing methylene chloride. The film was soluble in refluxing DMAc and m-cresol. Dynamic TGA indicated a five percent weight loss at 524° C. and a ten percent weight loss at 558° C. The film had a Tg of 274° C. The dielectric constant of this polyimide film was 2.91 at 10 GHz.

Example IV

Example IV A solution of DMAc (4.2725 g) and DABTF (0.4000 g, 0.002271 mol) and 3,3',4,4'-biphenyltetracarboxylic dianhydride (BPDA) (0.6681 g, 0.002271 mol) was prepared, and a film cast and cured as in Example III The inherent viscosity of the resulting poly(amic acid) solution was 0.89 dl/g at 35° C. in DMAc. The resulting thermally imidized very pale-gold colored film was creasable and insoluble in refluxing methylene chloride, DMAc and m-cresol. Dynamic TGA indicated a five percent weight loss at 550° C. and a ten percent weight loss at 572° C. The Tg of the polymer film was 329° C.

Example V

A solution of DMAc (4.1045 g) and DABTF (0.3000 g, 0.001703 mol) and isophthaloyldiphthalic anhydride (IDPA) (0.7261 g, 0.001703 mol) was prepared, and a film cast and cured as in Example III. The inherent viscosity of the resulting poly(amic acid) solution was 0.53 dl/g at 35° C. in DMAc. The resulting thermally imidized gold colored film was creasable and insoluble in refluxing methylene chloride, DMAc and m-cresol. Dynamic TGA indicated a five percent weight loss at 510° C. and a ten percent weight loss at 540° C. The Tg of the polymer film was 253° C.

Example VI

A solution of DMAc (3.5812 g) and DABTF (0.4000 g, 0.002271 mol) and pyromellitic dianhydride (PMDA) (0.4953 g, 0.002271 mol) was prepared, and a film cast and cured as in Example III. The inherent viscosity of the resulting poly(amic acid) solution was 0.93 dl/g at 35° C. in DMAc. The resulting thermally imidized film was brittle, gold colored and insoluble in refluxing methylene chloride and m-cresol. The film was soluble in refluxing DMAc. Dynamic TGA indicated a five percent weight loss at 548° C. and ten percent weight loss at 570° C. A Tg for this polymer was not observed by DSC or torsional braid analysis (TBA) up to 400° C.

Example VII

A solution of DMAc (3.6006) and DABTF (0.3000 g, 0.001703 mol) and bis(3,4-dicarboxyphenyl)dimethylsilane dianhydride (SiDA) (0.6001 g, 0.001703 mol) was prepared, and a film cast and cured as in Example III. The inherent viscosity of the resulting poly(amic acid) solution was 0.64 dl/g at 35° C. in DMAc. The resulting thermally imidized film was pale gold colored and snapped on creasing. The film was soluble in room temperature methylene chloride and refluxing DMAc and m-cresol. Dynamic TGA indicated five percent weight loss at 440° C. and ten percent weight loss at 451° C. The Tg of the resulting polymer was 263° C. Its dielectric constant was 2.75 at 10 GHz.

Example VIII

A solution of DMAc (2.9833 g) and DABTF (0.2458 g, 0.001395 mol) and sulfonyldiphthalic anhydride (SO$_2$DPA) (0.5000 g, 0.001395 mol) was prepared, and a film cast as in Example III. The inherent viscosity of the resulting poly(amic acid) solution was 0.51 dl/g 35° C. in DMAc. The thermally imidized pale yellow colored film snapped on creasing. The film was soluble in room temperature DMAc and refluxing m-cresol. Dynamic TGA indicated five percent weight loss at 492° C. and ten percent weight loss at 525° C. The Tg of the polymer was 310° C. by DSC.

Example IX

A solution of DMAc (4.6776 g) and DABTF (0.3000, 0.001703 mol) and 4,4'-bis(3,4-dicarboxyphenoxy)-diphenylsulfide dianhydride (BDSDA) (0.8694 g, 0.001703 mol) was prepared, and a film cast as in Example III. The inherent viscosity of the poly(amic acid) was 0.37 dl/g at 35° C. in DMAc. The resulting thermally imidized film was pale gold colored, creasable, and soluble in room temperature methylene chloride and refluxing DMAc and m-cresol. Dynamic TGA indicated five percent weight loss at 498° C. and ten percent weight loss at 528° C. The Tg of the polymer was 218° C. by DSC.

Example X

A solution of DMAc (13.7976 g) and DABTF (1.2500 g, 0.007069 mol) was prepared, and ODPA (2.1574 g, 0.006954 mol) added. The solution was stirred for 0.5 hours at room temperature before phthalic anhydride (0.0420 g, 0.0002838 mol) was added in one solid portion to end cap the polymer. This was stirred at room temperature overnight. The inherent viscosity of the resulting poly(amic acid) solution was 0.23 dl/g at 35° C. in DMAc. The solid was precipitated in toluene, filtered, dried and cured one hour at 100°, 200° and 300° C. in flowing air. The imidized material was placed in a mold under 1000 psi pressure at 300° C. for one-half hour to produce a one-inch in diameter disc molding, 0.087 inches in thickness.

Example XI

A solution of DMAc (2.9818 g) and 4-trifluoromethyl 2,6-diaminopyridine (0.1500 g, 0.0008468 mol) was prepared. 2,2-Bis(3,4-dicarboxyphenyl)hexafluoropropane dianhydride (6FDA) (0.3762 g, 0.0008468 mol) was added in a single solid portion, and the solution was stirred at room temperature overnight. The inherent viscosity of the resulting poly(amic acid) solution was 0.14 dl/g at 35° C. in DMAc. The polyimide had the following specific structure:

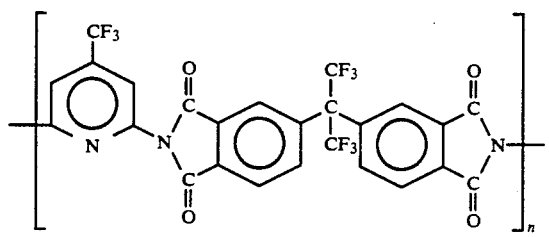

Polyimides of a similar general structure could be prepared in the same manner. The general structure is

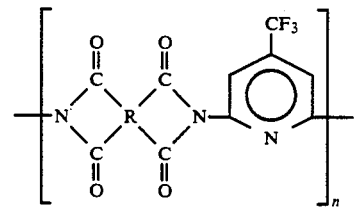

The present invention has been described in detail with respect to certain preferred embodiments thereof. As is understood by those of skill in the art, variations and modifications in this detail may be effected without any departure from the spirit and scope of the present invention, as defined in the hereto-appended claims.

What is claimed is:

1. A high performance, thermooxidately stable polyimide having the following general structure:

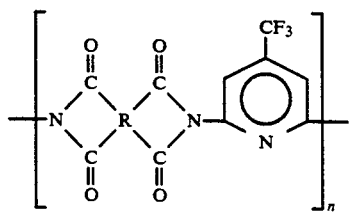

Where R is any aromatic or substituted aromatic group

-continued
and n ≈ 10-100.

2. A high performance, thermooxidately stable polyimide prepared by reacting 4-trifluoromethyl-2,6-diaminopyridine and a dianhydride in an amide solvent to form a poly(amic acid), followed by cyclizing the poly(amic acid) to the corresponding polyimide.

3. A polyimide according to claim 1, having the following specific structure:

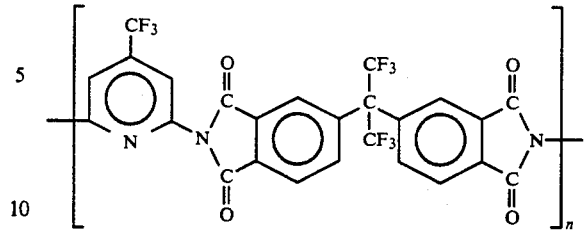

4. A high performance, thermooxidatively stable polyimide having the following general structure:

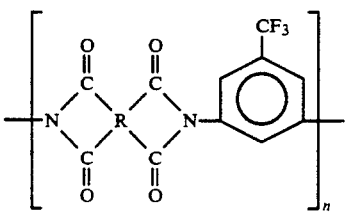

where R is any aromatic or substituted aromatic group and n=10-100, and having a specific structure selected from the group consisting of

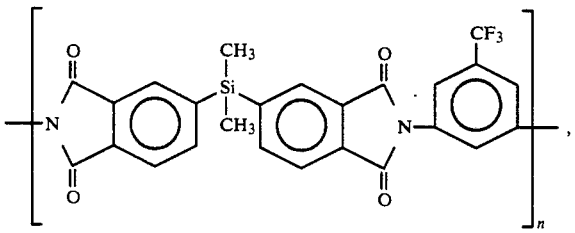

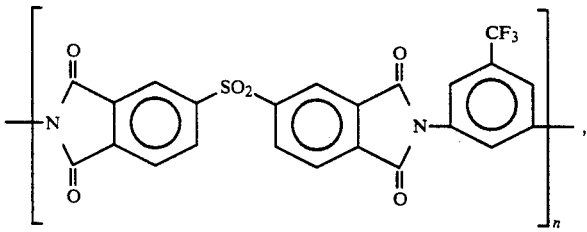

and

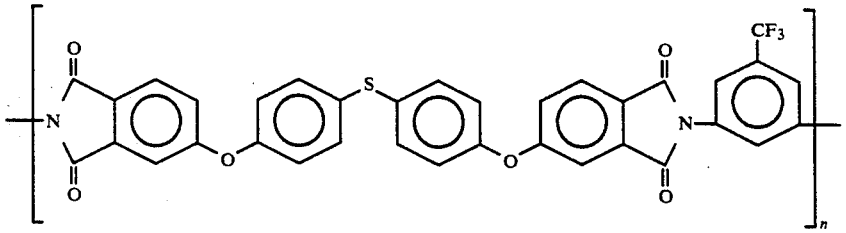

* * * * *